US007538661B2

(12) United States Patent
Claussen et al.

(10) Patent No.: US 7,538,661 B2
(45) Date of Patent: May 26, 2009

(54) TIRE PRESSURE MANAGEMENT SYSTEM VALVE INTEGRITY VERIFICATION METHOD (75) Inventors: Stephen P. Claussen, Richland, MI (US); Daryl J. Stacer, Portage, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 0 days.

(21) Appl. No.: 11/893,258

(22) Filed: Aug. 15, 2007

(65) Prior Publication Data
US 2007/0290826 A1 Dec. 20, 2007

Related U.S. Application Data (63) Continuation of application No. 11/080,386, filed on Mar. 15, 2005, now Pat. No. 7,265,659, which is a continuation of application No. 10/004,653, filed on Dec. 3, 2001, now Pat. No. 6,894,607.

(51) Int. Cl.
B60C 23/00 (2006.01)
(52) U.S. Cl. .................... 340/442; 73/146.3; 137/224; 137/225; 152/415
(58) Field of Classification Search ................. 340/442, 340/447; 152/415, 417; 73/146.3; 137/225
See application file for complete search history.

(56) References Cited

U.S. PATENT DOCUMENTS

| 2,695,122 | A | 11/1954 | Learman |
|---|---|---|---|
| 4,441,539 | A | 4/1984 | Hulse |
| 4,456,038 | A | 6/1984 | Gwaltney et al. |
| 4,506,708 | A | 3/1985 | Onuma |
| 4,619,303 | A | 10/1986 | Bryan et al. |
| 4,640,331 | A | 2/1987 | Braun et al. |
| 4,678,017 | A | 7/1987 | Schultz |
| 4,708,184 | A | 11/1987 | Pechar |
| 4,724,879 | A | 2/1988 | Schultz et al. |
| 4,744,399 | A | 5/1988 | Magnuson et al. |
| 4,754,792 | A | 7/1988 | Braun et al. |
| 4,763,709 | A | 8/1988 | Scholer |
| 4,782,878 | A | 11/1988 | Mittal |
| 4,782,879 | A | 11/1988 | Le Chatelier et al. |
| 4,825,925 | A | 5/1989 | Schultz |
| 4,860,579 | A | 8/1989 | Beverly |
| 4,875,509 | A | 10/1989 | Da Silva |
| 4,883,105 | A | 11/1989 | Schultz |
| 4,883,106 | A | 11/1989 | Schultz et al. |
| 4,893,664 | A | 1/1990 | Oltean |
| 4,898,216 | A | 2/1990 | Schultz et al. |
| 4,905,742 | A | 3/1990 | Mohs |
| 4,917,163 | A | 4/1990 | Schultz |
| 4,922,946 | A | 5/1990 | Boulicault |
| 4,924,926 | A | 5/1990 | Schultz et al. |
| 5,094,263 | A | 3/1992 | Hurrell, II et al. |
| 5,121,774 | A | 6/1992 | Hicks et al. |

(Continued)

Primary Examiner—Brent Swarthout
(74) Attorney, Agent, or Firm—Marshall & Melhorn, LLC (57) ABSTRACT A method of verifying the integrity of a valve in service in a tire pressure management system is disclosed. The method of verifying valve integrity of a valve interposed between a tire and conduit assemblies for conducting fluid to and/or from the tire in a tire maintenance system includes closing the valve for prohibiting fluid flow into the conduit assemblies in fluid communication with the valve and monitoring the pressure of fluid in the conduit assemblies in fluid communication with the valve for ascertaining a pressure increase therein.

19 Claims, 3 Drawing Sheets

U.S. PATENT DOCUMENTS

| | | |
|---|---|---|
| 5,174,839 A | 12/1992 | Schultz et al. |
| 5,179,981 A * | 1/1993 | Hicks et al. ................ 141/4 |
| 5,180,456 A | 1/1993 | Schultz et al. |
| 5,244,027 A | 9/1993 | Freigang |
| 5,253,687 A | 10/1993 | Beverly et al. |
| 5,263,524 A | 11/1993 | Boardman |
| 5,273,064 A | 12/1993 | Beverly et al. |
| 5,291,776 A | 3/1994 | Mallison |
| 5,309,969 A | 5/1994 | Mittal |
| 5,313,995 A | 5/1994 | Schultz |
| 5,505,080 A | 4/1996 | McGhee |
| 5,516,379 A | 5/1996 | Schultz |
| 5,540,268 A * | 7/1996 | Mittal ................. 152/415 |
| 5,546,789 A | 8/1996 | Balke et al. |
| 5,553,647 A * | 9/1996 | Jaksic ................. 152/415 |
| 5,600,301 A | 2/1997 | Robinson, III |
| 5,611,875 A | 3/1997 | Bachhuber |
| 5,629,873 A | 5/1997 | Mittal et al. |
| 5,629,874 A | 5/1997 | Mittal |
| 5,674,332 A | 10/1997 | Battocchio |
| 5,838,229 A | 11/1998 | Robinson, III |
| 5,891,277 A * | 4/1999 | Bachhuber ............ 152/415 |
| 6,067,850 A | 5/2000 | Lang et al. |
| 6,098,682 A * | 8/2000 | Kis ..................... 152/415 |
| 6,246,317 B1 | 6/2001 | Pickornik et al. |
| 6,250,327 B1 | 6/2001 | Friegang et al. |
| 6,283,186 B1 | 9/2001 | Krisher |
| 6,293,147 B1 * | 9/2001 | Parker et al. ............ 73/462 |
| 6,561,017 B1 | 5/2003 | Claussen et al. |
| 6,604,414 B1 | 8/2003 | Claussen et al. |
| 6,894,607 B1 | 5/2005 | Claussen et al. |

* cited by examiner

TIRE PRESSURE MANAGEMENT SYSTEM VALVE INTEGRITY VERIFICATION METHOD

This application is a continuation application of U.S. application Ser. No. 11/080,386, filed Mar. 15, 2005, now U.S. Pat. No. 7,265,659, the entire disclosure of which is incorporated herein by reference, and which itself is a continuation application of U.S. patent application Ser. No. 10/004,653 filed Dec. 3, 2001, now U.S. Pat. No. 6,894,607, the entire disclosure of which is incorporated herein by reference.

BACKGROUND OF THE INVENTION

Conventional tire pressure management systems typically have central tire inflation systems (CTI systems), also known as on-board inflation systems and traction systems. These tire pressure management systems are well known, as may be seen by reference to the following U.S. Pat. Nos.: 5,516,379; 5,313,995; 5,273,064; 5,253,687; 5,180,456; 5,179,981; 5,174,839; 5,121,774; 4,924,926; 4,922,946; 4,917,163; 4,893,664; 4,883,106; 4,883,105; 4,825,925; 4,782,879; 4,754,792; 4,724,879; 4,678,017; 4,640,331; and 4,619,303. The entire disclosure of each of these patents is incorporated herein.

Generally, tire pressure management systems employ a pneumatically controlled wheel valve that is affixed to each vehicle wheel assembly for controlling tire pressure in response to pressure signals from a fluid control circuit. The fluid control circuit is connected to each wheel valve via a rotary seal assembly associated with each wheel valve. Tire pressure is monitored by means of a sensor that is positioned in a conduit assembly in the fluid control circuit. When the wheel valve and certain control valves are opened, the pressure in the conduit assembly equalizes to tire pressure which can be sensed by the sensor. An electronic control unit receives electrical pressure signals generated by the sensor and appropriately controls the fluid control circuit in response thereto for inflating or deflating a selected tire.

Figure 2:
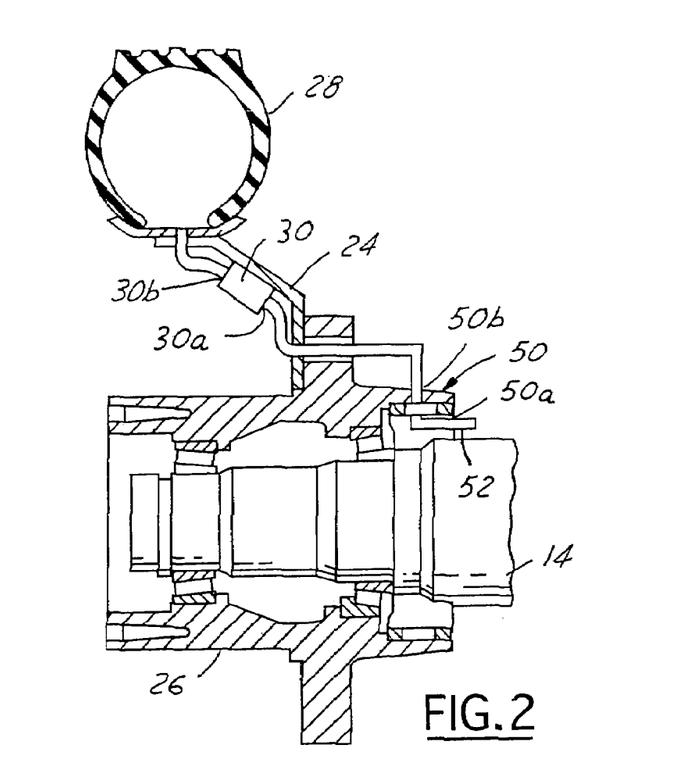
FIG. 2 is a cross-sectional detail view of a conventional vehicle wheel assembly.

Despite the advances gained in tire pressure management systems, while in service, system failures can develop with potentially costly and/or dangerous consequences. Specifically, referring again to FIG. 2, although wheel valve assembly 30 eliminates a potential failure mode in the supply lines between the supply and a tire by venting same, thereby stemming line breakdown ordinarily occasioned from long-term pressurization, wheel valve assembly 30 becomes a potential failure mode. Failure of wheel valve assembly 30 could lead to rapid deflation of an associated tire 28, which could cause the imposition of an unbearable load on a weakened paired tire 28, thus ultimate failure of a tire pair on one end of an axle. This could lead to loss of control of vehicle 12 or damaging load shifting therein. What is needed is a method of verifying the integrity of a valve, such as a check valve, in service in a tire pressure management system.

SUMMARY OF THE INVENTION

The invention provides a method of verifying the integrity of a valve in service in a tire pressure management system. The method of verifying valve integrity of a valve interposed between a tire and conduit assemblies for conducting fluid to and/or from the tire in a tire maintenance system includes closing the valve for prohibiting fluid flow into the conduit assemblies in fluid communication with the valve and monitoring the pressure of fluid in the conduit assemblies in fluid communication with the valve for ascertaining a pressure increase therein.

The invention provides improved elements and arrangements thereof, for the purposes described, which are inexpensive, dependable and effective in accomplishing intended purposes of the invention. Other features and advantages of the present invention will become apparent from the following description of the preferred embodiment, which refers to the accompanying drawings.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENT

The invention is an apparatus for and a method of verifying the integrity of a valve. Specifically, the invention verifies the capacity of a valve to effectively prevent fluid from passing therethrough, such as, for example, air escaping from a tire when a tire pressure management system is not inflating or deflating vehicle tires.

Figure 1:
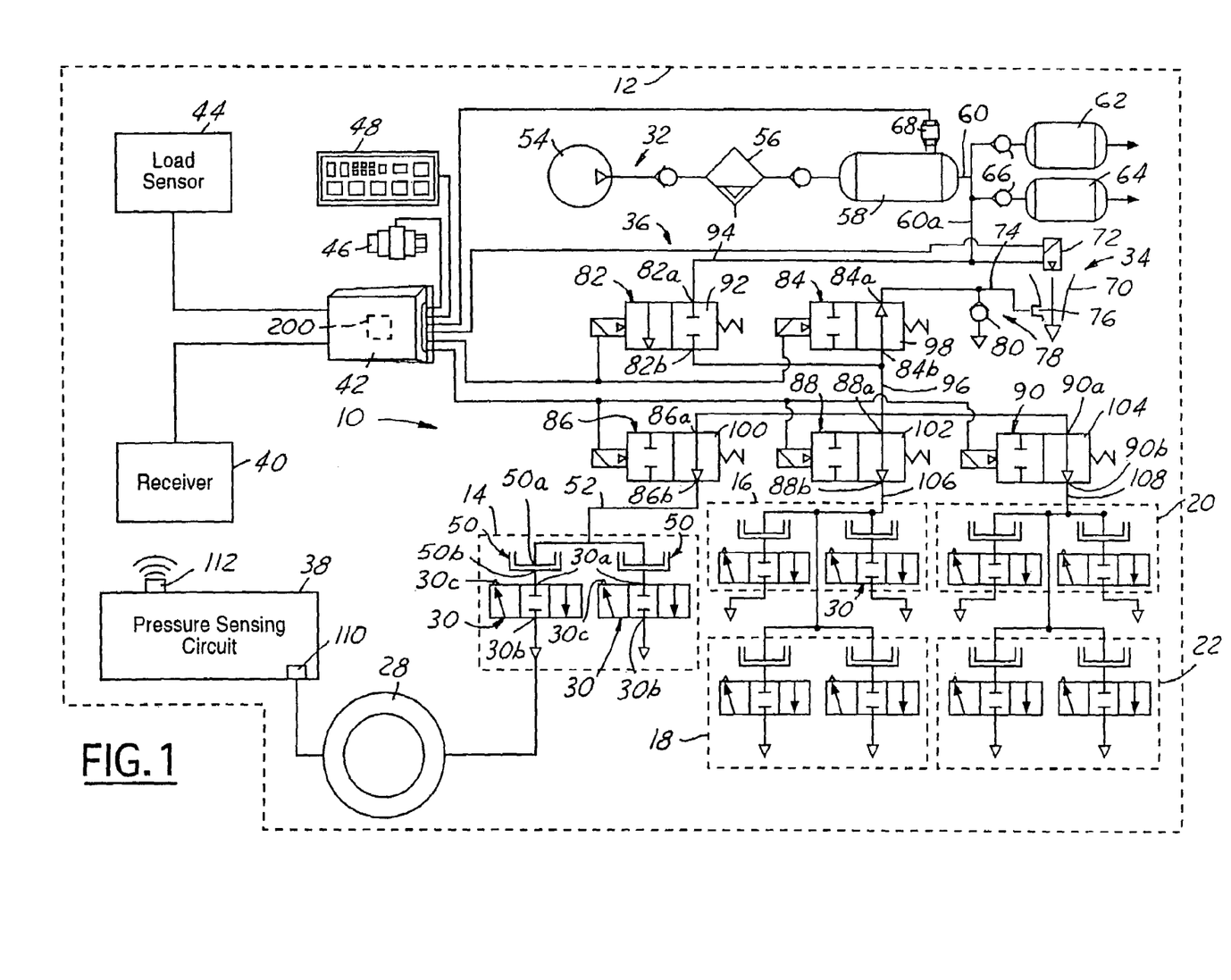
FIG. 1 is a diagrammatic view of a tire pressure management system for a vehicle, a vehicle incorporating same being shown in dotted line.

FIG. 1 shows a tire pressure management system 10 for a vehicle 12 for describing, but not limiting applicability of the invention. Vehicle 12 may be, but is not limited to being a tractor-trailer. The system maybe used in connection with a wide variety of vehicles, including automobiles.

Vehicle 12 may include a plurality of axles, including a steer axle 14, a tandem axle assembly having drive axles 16, 18 and another tandem axle assembly having trailer axles 20, 22. As shown in greater detail in FIG. 2, each axle, such as drive axle 14, may include wheels 24 affixed to wheel hubs 26 disposed at each outboard end of the axle and rotationally supported on axle 14. Each wheel 24 may include one or more inflatable tires 28 mounted thereon.

System 10 monitors and controls pressure within each tire 28 of vehicle 12. System 10 may include wheel valve assemblies 30, a fluid source 32, a vacuum source 34, and a fluid control circuit 36. System 10 may further include a plurality of pressure sensing circuits 38, one or more receivers 40, one or more electronic control units 42, one or more load sensors 44, a speed sensor 46, and an operator control device 48.

Wheel valve assemblies 30 are provided to control the flow of pressurized fluid into and out of tires 28. Valve assembly 30 is mounted to each end of each axle and is connected to the remainder of system 10 through a rotary seal connection 50. Wheel valve assembly 30 is conventional in the art and may include the wheel valve assembly described and illustrated in U.S. Pat. No. 5,253,687 or U.S. Pat. No. 6,250,327, the entire disclosures of which are incorporated herein.

Rotary seal assembly 50 also is conventional in the art and may include the rotary seal assembly described and illustrated in U.S. Pat. No. 5,174,839, the entire disclosure of which also is incorporated herein.

Referring again to FIG. 2, wheel valve assembly 30 may include an inlet port 30a coupled to a rotatable port 50b of rotary seal assembly 50, an outlet port 30*b* in fluid communication with the interior of tire 28, and an exhaust port 30*c*, best shown in FIG. 1. Rotary seal assembly 50 may further include a non-rotatable port 50*a* connected to a conduit 52 of fluid control circuit 36. Valve assembly 30 assumes a closed position, as illustrated in FIG. 1, when the fluid pressure at inlet port 30*a* is substantially atmospheric, an open position connecting inlet port 30*a* and outlet port 30*b* when the fluid pressure at inlet port 30*a* is a positive pressure, and an exhaust position connecting outlet port 30*b* and exhaust port 30*c* when the fluid pressure at inlet port 30*a* is a negative pressure.

Fluid source 32 provides positive pressurized fluid to system 10 and tires 28. Fluid source 32 is conventional in the art and may include a pressure source, such as a pump 54, an air dryer 56, and a first fluid tank 58 connected via a conduit 60 to the brake system fluid tanks 62, 64 and to the fluid control circuit 36 via a branch conduit 60*a*. Check valves 66 prevent sudden loss of fluid pressure in brake tanks 62, 64 in the event of upstream pressure loss. A pressure sensor 68 monitors pressure within tank 58 and provides a pressure indicative signal to electronic control unit 42.

Vacuum source 34 produces a negative pressure in system 10 to decrease fluid pressure in tires 28 of vehicle 12. Vacuum source 34 also is conventional in the art and may include a vacuum generator 70 controlled through a solenoid valve 72. A low pressure zone is produced by passing fluid through a venturi like portion of vacuum generator 70. Upon urging solenoid valve 72 into an open position via a control signal from electronic control unit 42, a vacuum or negative fluid pressure, relative to atmospheric pressure, is introduced in a conduit 74, which has a small orifice 76 disposed proximate the low pressure zone produced by generator 70. Conduit 74 also is connected to a one-way vent valve 78 for rapid venting of positive fluid pressure from conduit 74. Vent valve 78 includes a valving member 80 that is drawn into a closed position in response to negative fluid pressure in conduit 74 and is urged into an open position in response to positive pressure fluid in conduit 74.

Fluid control circuit 36 directs the flow of pressurized fluid within system 10 for controlling pressure in tires 28 of vehicle 12. Control circuit 36 may include a pair of pressure control valves 82, 84 and a plurality of axle distribution valves 86, 88, 90. As shown, a single fluid control circuit 36 controls pressure in all of the tires 28 of vehicle 12. However, control circuit 36, and other portions of system 10, may be replicated so that, for example, one control circuit 36 may control tire pressures in the tractor portion of vehicle 12 and another control circuit 36 may control tire pressure in the trailer portion of vehicle 12.

Pressure control valve 82 directs positive pressurized fluid from fluid source 32 to tires 28 of vehicle 12. Valve 82 may include a conventional two position-two way, solenoid controlled and pilot fluid operated valve. Valve 82 includes a valving member 92 that is spring biased toward a closed position, as shown in FIG. 1. Valving member 84 assumes an open position in response to energizing of a solenoid operatively associated therewith via control signals from electronic control unit 42. Valve 82 has a first port 82*a* coupled to a conduit 94 leading to fluid source 32. Valve 82 has a second port 82*b* coupled to another conduit 96 leading to axle distribution valves 86, 88, 90.

Pressure control valve 84 vents control circuit 36. Valve 84 is conventional in the art and may also include a two position-two way, solenoid controlled and pilot fluid operated valve. Valve 84 includes a valving member 98 that is spring biased toward an open position, as shown in FIG. 1. Valving member 98 assumes a closed position in response to energizing a solenoid operatively associated therewith via control signals from electronic control unit 42. Valve 84 has a first port 84*a* coupled to conduit 74 leading to orifice 76. Valve 84 has a second port 84*b* coupled to conduit 96 leading to axle distribution valves 86, 88, 90.

Axle distribution valves 86, 88, 90 limit the supply of positive pressurized fluid to, or the release of fluid from, the tires 28 of one or more axles 14, 16, 18, 20, 22 of vehicle 12. Valves 86, 88, 90 are conventional in the art and may include two position-two way, solenoid controlled and pilot fluid operated valves. Valves 86, 88, 90 direct the flow of fluid to and from the tires 28 of axles 14, 16 and 18, and 20 and 22, respectively. Each of valves 86, 88, 90 includes a valving member 100, 102, 104, respectively, that is spring-biased toward an open position, as shown in FIG. 1, and which assumes a closed position in response to energizing a solenoid operatively associated therewith via electrical signals from electronic control unit 42. Each of valves 86, 88, 90 respectively has first ports 86*a*, 88*a*, 90*a* coupled to conduit 96. Each of valves 86, 88, 90 respectively has second ports 86*b*, 88*b*, 90*b* leading to respective corresponding conduits 52, 106, 108 for each axle or tandem axle of vehicle 12.

Although axle distribution valves 86, 88, 90 are shown, individual tire distribution valves could be used in conjunction with axle distribution valves 86, 88, 90 or as an alternative to axle distribution valves 86, 88, 90 to further control the flow of fluid to and from individual tires 28 of vehicle 12. Further, although only three axle distribution valves 86, 88, 90 are shown, the number of axle distribution valves may be varied depending upon the number of axles of vehicle 12 and to allow for greater individual control of the tires 28 of vehicle 12.

Pressure sensing circuits 38 monitor the tire pressure in each tire 28 of vehicle 12. A variety of pressure sensing circuits 38 are known in the art, such as the pressure sensing circuits described and illustrated in U.S. Pat. Nos. 5,600,301 and 5,838,229 assigned to Schrader-Bridgeport, International, Inc. Each circuit 38 may include a pressure transducer 110 in fluid communication with the interior of a vehicle tire 28. Each circuit 38 also includes a radio-frequency transmitter 112 that transmits a parameter signal indicative of a measured parameter associated with a corresponding tire 28 of vehicle 12. Circuit 38 maybe configured so that transmitter 112 transmits parameter signals at a periodic rate or when a predetermined event occurs, such as a specific change in pressure level.

The parameter may be pressure or another value, such as tire temperature, that may be indicative of tire pressure. The parameter signal preferably is encoded with a tire identification code to uniquely identify the particular tire 28 to which the signal corresponds. The encoding of radio-frequency signals with unique identification codes is well known in the art and may be implemented in a variety of ways known in the art such as by frequency shift key modulation.

Receivers 40 receive the radio-frequency signals generated by transmitters 112 of pressure sensing circuits 38 and provide electronic signals to electronic control unit 42 corresponding to the received radio-frequency signals. Receivers 40 are conventional in the art and may form part of control unit 42. The number of receivers 40 used in system 10 may depend upon the number of vehicle tires 28, the location of pressure sensing circuits 38 and other factors. In the case of a tractor-trailer, multiple receivers 40 may be needed to maintain signal integrity because of the relatively large distance between the tires 28 of the tractor-trailer and the relatively large number of tires 28. Where multiple receivers 40 are used, each receiver 40 may be coupled to electronic control unit 42. Alternatively, several secondary receivers may be coupled through a hardwired, radio-frequency or power lead communication connection to a primary receiver that is electrically connected to the electronic control unit 42. The use of "wireless" connections between the primary and secondary receivers by, for example, the inclusion of radio-frequency transmitters in the secondary receivers, enables different trailers to be secured to the tractor of vehicle 12 without requiring the decoupling and coupling of a plurality of electrical connections.

Figure 3:
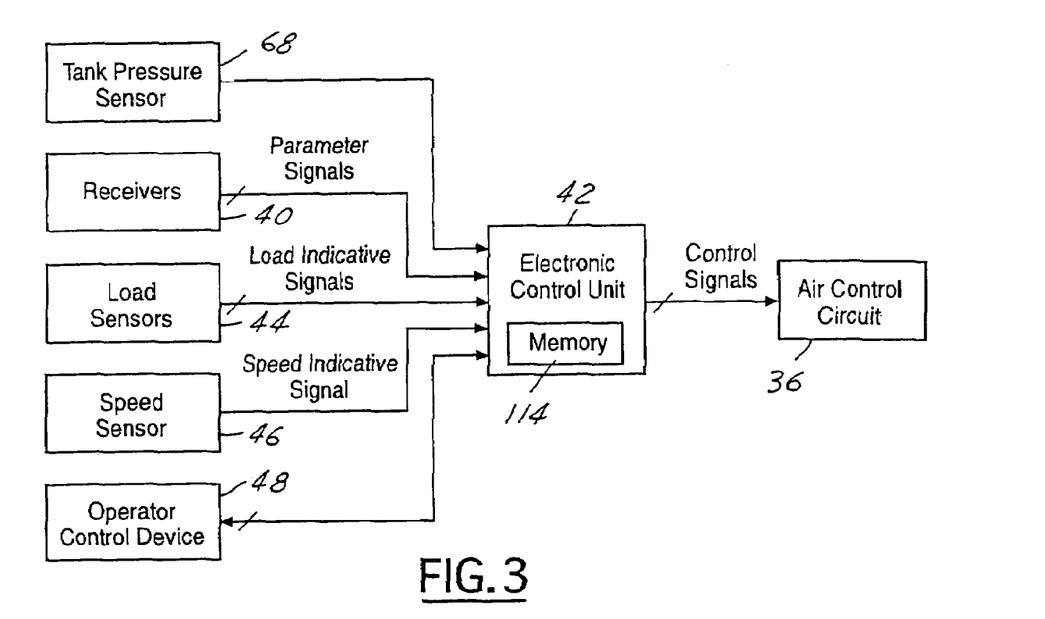
FIG. 3 is a schematic view of components of the system of FIG. 1.

Referring to FIG. 3, electronic control unit 42 controls fluid control circuit 38. Control unit 42 may include a microprocessor operating under the control of a set of programming instructions commonly referred to as software. Electronic control unit 42 may include a memory 114 in which the programming instructions are stored. Memory 114 also may contain identification codes for each tire 28 of vehicle 12 to uniquely identify the particular tire 28 to which a particular parameter signal corresponds. Memory 114 also may be used to record tire pressure values or user inputs over a period of time to assist in evaluating tire pressure management.

Control unit 42 may receive input signals from receivers 40, one or more load sensors 44, speed sensor 46, and operator control device 48. Control unit 42 outputs a plurality of control signals to control valves 82, 84, 86, 88, 90 of fluid control circuit 36 and solenoid valve 72 of vacuum source 34. Control unit 42 also may generate a plurality of output signals to a display device which may include a part of operator control device 48 or a freestanding device. The latter signals may be used to trigger the display pressure readings and/or deflection levels for each vehicle tire 28, the load on vehicle 12 or a portion of it, and the speed of vehicle 12. The signals may also be used to trigger warnings to the operator of vehicle 12 in the event that pressure cannot be maintained in one of the vehicle tires 28, the pressure exceeds or falls below predetermined maximum and minimum tire pressure values, or the pressure differs from a target pressure value by more than a predetermined amount.

Although a single electronic control unit 42 receives signals generated by all of pressure sensing circuits 38 and generates control signals for all of valves 82, 84, 86, 88, 90 of fluid control circuit 36, more than one electronic control unit 42 may be used. For example, one electronic control unit may monitor pressure in tires 28 of the steer and drive axles 14, 16, 18 of vehicle 12 and to control fluid pressure thereof, while a second electronic control unit may monitor pressure in tires 28 of the trailer axles 20, 22 and to control fluid pressure thereof. If multiple units are employed, a hardwired, radio-frequency, or power lead communication connection preferably is made between the units to allow sharing of information between the units and integrated control of input/output devices such as operator control device 48.

Load sensors 44 provide an indication as to the load on vehicle 12 and, consequently, tires 28 of vehicle 12, or the load on some portion of vehicle 12 and, consequently, select tires 28 of vehicle 12. Load sensors 44 are conventional in the art and load sensing may be provided in a variety of known ways, including through analysis of pneumatic pressure in the suspension of vehicle 12, analysis of powertrain parameters, the use of displacement transducers, or the implementation of load beams and strain gauges. Each load sensor 44 may provide one or more signals to electronic control unit 42 indicative of the load bearing on vehicle 12 or a portion thereof.

Electronic control unit 42 may initiate pressure adjustment in tires 28 of vehicle 12 in response to signals from load sensors 44 in a variety of ways. For example, electronic control unit may cause an increase or decrease in the pressure in one or more tires 28 responsive to a corresponding increase or decrease in vehicle load based on a variety of linear or non-linear functions. One or more tire deflection tables may be stored in a memory, such as memory 114, and accessed by electronic control unit 42 responsive to the signals from load sensors 44.

Speed sensor 46 measures the speed of vehicle 12 to further control deflection levels for tires 28. High deflection levels can create safety concerns and reduce tire life if maintained while vehicle 12 is operating at relatively high speeds. Speed sensor 46 is conventional in the art and provides a signal to electronic control unit 42 corresponding to speed.

Operator control device 48 may allow the operator of vehicle 12 to exert at least some level of control over system 10. Device 48 is conventional in the art and may include a plurality of input/output devices, such as a keypad, touch screen, switches or similar input devices, and a display screen, sound generator, lights or similar output devices. Thus, device 48 permits an operator of vehicle 12 to transmit control signals to electronic control unit 42 to adjust pressure levels within the tires 28 of vehicle 12. The control signals may, for example, correspond to deflection levels for tires 28 of vehicle 12. As a result, the operator is able to adjust the deflection level of the tires 28 to correspond to the terrain over which vehicle 12 is traveling. Such control is desirable to provide improved floatation and traction on certain terrain.

Referring again to FIG. 1, the invention employs a sensor 200, preferably electronically integrated in control unit 42, for monitoring fluid pressure in the conduit assemblies of the fluid control circuit 36 between the fluid and vacuum sources 32, 34 and the wheel valves 30. Sensor 200 may assume any form appropriate for measuring pressure in a conduit assembly. Sensor 200 may sense and respond to extant pressure in the conduit assemblies, changes therein or other properties appropriate for achieving the invention. Sensor 200 is configured to sense conduit assembly pressure changes and respond accordingly. Sensor 200 may respond to any of the foregoing properties by, for example, transmitting a corresponding signal to which control unit 42 is responsive.

Control unit 42 monitors or processes, rather than merely receives, input from sensor 200 at least when sensor 200 is in fluid communication with at least one valve assembly 30 and when system 10 is not inflating or deflating any of tires 28. The sequencing and interaction of components of system 10, such as sensor 200 and control unit 42, may be appreciated more readily in the context of the following description of the present method.

Figure 4:
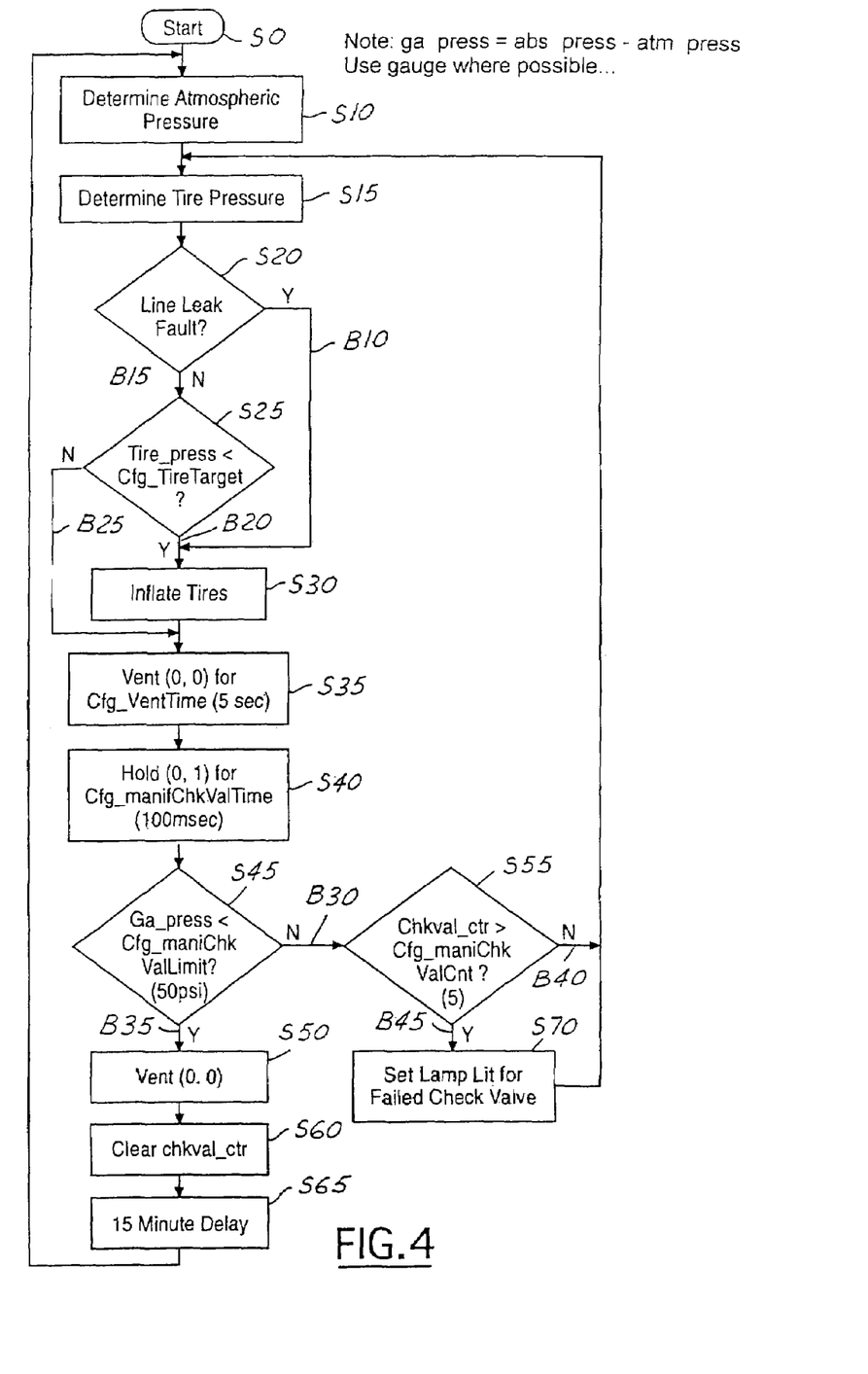
FIG. 4 is a schematic view of a flow chart for a method configured according to the invention.

FIG. 4 diagrammatically shows a flow chart of the present method. The method may be a routine called within the execution of a master tire pressure maintenance program (not shown).

At step S10, the invention provides for determining atmospheric pressure. Atmospheric pressure may be measured using sensor 200 upon closing valves 82, 86, 88, and 90 and opening valve 84 to place the conduits of fluid control circuit 36 in fluid communication with outside air. Alternatively, atmospheric pressure may be measured using a conventional dedicated pressure sensor (not shown) external to fluid control circuit 36 and in communication with control unit 42. The measured atmospheric pressure value may then be stored in a memory of control unit 42. Control unit 42 then generates an offset value based on the measured current atmospheric pressure to compensate absolute pressure values, such as a desired target tire pressure, referenced by control unit 42 during tire pressure maintenance. Control unit 42 then passes control to step S15.

At step S15, the invention provides for determining the pressure in tires 28. This may be achieved, for example, by polling any or all of sensors 38 in tires 28, as described above, or other suitable process. Control unit 42 then passes control to step S20.

At step S20, the invention provides for determining whether a line leak fault exists. Control unit 42 evaluates whether a line leak flag was set by a line leak testing routine (not shown) which determines whether the conduit assemblies exhibit an incapacity to maintain fluid pressure, for example, due to a rupture. If control unit 42 determines that a line leak flag has been set, control unit 42 passes control along branch B10 to step S30, described below. If control unit 42 determines that a line leak does not exist, control unit 42 passes control along branch B15 to step S25.

At step S25, the invention provides for determining whether the tires are fully inflated. Control unit 42 compares the measured tire pressures against an operator-configurable, or operator designated, target pressure. If a measured pressure is less than the target pressure, control unit 42 determines that the tires are not fully inflated and passes control along branch B20 to step S30, described below. If the measured pressure is at least equal to the target pressure, control unit 42 determines that the tires are at least fully inflated and passes control along branch B25 to step S35, as described below.

At step S30, the invention provides for inflating any or all of tires 28. This may be achieved by any suitable method, such as by pressurizing the conduit assemblies until the pressure therein is at least equal to a target pressure. To this end, control unit 42 instructs solenoid 82 and any of control solenoids 86, 88 and/or 90 to open, and solenoid 84 to close, thereby supplying pressurized fluid to tires 28, as described above, for a predetermined supplying duration. Following the supplying duration, control unit 42 instructs conduit 82 to close, thereby preventing pressurized fluid from reaching any of control solenoids 86, 88 and/or 90. Control unit 42 then passes control to step S35.

At step S35, the invention provides for venting the conduit assemblies for an operator-configured, or operator designated, venting duration. The venting duration should be sufficient to allow the conduit assemblies to reach equilibrium with atmospheric pressure. As described above, control unit 42 vents the conduit assemblies by instructing solenoid 84 to open, while any of control solenoids 86, 88 and/or 90 are open, thereby enabling fluid communication between the conduit assemblies and valve 78. Because valving member 80 of valve 78 only opens in response to positive fluid pressure and closes in response to neutral or negative fluid pressure, valve 78 closes naturally when the conduit assemblies are at atmospheric pressure. After the venting duration elapses, control unit 42 instructs solenoid 84 to close and isolate valve 78, thereby preventing further venting, of the conduit assemblies. Lacking positive or negative fluid pressure at inlet port 30a, each valve assembly 30 should assume a closed position. Thus, absent positive pressure toward a tire 28 or a vacuum for drawing fluid from a tire 28, valve assembly 30 should remain closed and prohibit fluid from passing from a tire 28 into the conduit assemblies. Control unit 42 then passes control to step S40.

At step S40, the invention provides for determining the pressure in the conduit assemblies. Closing solenoids 82 and 84, yet leaving open any of control solenoids 86, 88 and/or 90 defines a fixed volume among solenoids 82 and 84 and one or more valve assemblies 30 caused to be in fluid communication therewith via open solenoid 86, 88 and/or 90. Thus, if a valve assembly 30 leaks, the conduit assemblies will realize a corresponding pressure increase. Sensor 200 senses and responds to the pressure increase. Control unit 42 registers the response of sensor 200. Control unit 42 then passes control to step S45.

At step S45, the invention provides for determining whether the gage pressure in the conduit assemblies is less than a limit. The limit may be based on, for example, anticipated bleed or make-up air supplied to the conduit assembles to counteract inevitable conduit assembly leakage, such as provided in the U.S. patent application filed contemporaneously herewith, associated with Ser. No. 10/004,762, which is incorporated herein. The gage pressure measured in the conduit assemblies constitutes a pressure in excess of atmospheric pressure, or an absolute increase in pressure in the conduit assemblies since venting in step S35. Control unit 42 compares the response of sensor 200, which is indicative of the conduit assembly pressure, with the limit. If the conduit assembly pressure is not less than the limit, potential exists for a failure of a valve assembly 30, therefore control unit 42 passes control along branch B30 to step S55, described below. If the conduit assembly pressure is less than the limit, valve assemblies 30 are deemed to be functioning properly, therefore control unit 42 passes control along branch B35 to step S50, described below. The limit is manufacturer-configurable, or manufacturer designated.

At step S55, the invention provides for determining whether the conduit assembly gage pressure has exceeded the limit for a specified number of consecutive tests. Thus, if repeated inflations are followed by pressure drops that exceed a predetermined limit, such is interpreted as a failure of a valve assembly 30. To this end, control unit 42 increments a counter and checks the updated value stored in the counter against a specified value set by the operator. If the counter does not exceed the stored value, control unit 42 passes control along branch B40 back to step S15, described above. If the counter exceeds the stored value, control unit 42 passes control to step S70.

At step S70, the invention provides for alerting the operator that a valve assembly 30 may have failed. Control unit 42 may set a lamp or trigger other suitable alarm. Control unit 42 then passes control back to step S15, described above.

Step S50 is comparable to step S35, described above, thus described no further herein. Control unit 42 then passes control to step S60.

At step S60, the invention provides for clearing the counter described with respect to step S55 to avoid triggering a false alarm, for example, if control passes to step S55 for a first or other time less than a specified number of times. Control unit 42 then passes control to step S65.

At step S65, the invention provides for delaying initiating step S10 for a specified amount of time, such as 15 minutes. After the delay, control unit 42 then passes control back to step S10, as described above, to again ascertain the pressure status of tires 28 and valve assemblies 30, or check valves, associated therewith.

While the invention has been particularly shown and described with reference to the preferred embodiments thereof, it is well understood by those skilled in the art that various changes and modifications can be made in the invention without departing from the spirit and scope of the invention.

We claim:

1. A tire pressure management system, comprising:
   a conduit conducting fluid to and from a tire;
   a wheel valve disposed between said conduit and said tire;
   a sensor in fluid communication with said conduit and generating a fluid pressure signal indicative of fluid pressure in said conduit; and, an electronic control unit configured to urge said wheel valve to a closed position and to subsequently determine whether said wheel valve has failed by comparing said fluid pressure signal to a first predetermined condition indicative of an increase in fluid pressure in said conduit.

2. The tire pressure management system of claim 1, further comprising an alarm and wherein said electronic control unit is further configured to activate said alarm if said electronic control unit determines said wheel valve has failed.

3. The tire pressure management system of claim 2 wherein said alarm comprises a lamp.

4. The tire pressure management system of claim 1 wherein said electronic control unit is further configured, in determining whether said wheel valve has failed, to update a counter when said fluid pressure signal meets said first predetermined condition.

5. The tire pressure management system of claim 1 wherein said wheel valve comprises a check valve.

6. The tire pressure management system of claim 1 wherein said electronic control unit is further configured to compare said failure pressure signal to said first predetermined condition a predetermined period of time after urging said wheel valve to said closed position.

7. A tire pressure management system, comprising:
a conduit conducting fluid to and from a tire;
a first control valve coupled to said conduit and movable between a first position permitting fluid communication between a fluid source and said conduit and a second position prohibiting fluid communication between said fluid source and said conduit;
a second control valve coupled to said conduit and movable between a first position permitting fluid communication between said conduit and atmosphere and a second position prohibiting fluid communication between said conduit and atmosphere;
a wheel valve disposed between said conduit and said tire;
a sensor in fluid communication with said conduit and generating a fluid pressure signal indicative of fluid pressure in said conduit; and,
an electronic control unit configured to move said second control valve to said first position for said second control valve to thereby vent said conduit and urge said wheel valve to a closed position and to subsequently determine whether said wheel valve has failed by comparing said fluid pressure signal to a fist predetermined condition indicative of an increase in fluid pressure in said conduit.

8. The tire pressure management system of claim 7 wherein said electronic control unit is further configured to move said second control valve to said second position for said second control valve following said venting of said conduit.

9. The tire pressure management system of claim 7 wherein said electronic control unit is further configured to maintain said first control valve in said second position for said first control valve during a time period following said venting of said conduit and before said comparison of said fluid pressure signal to said first predetermined condition.

10. The tire pressure management system of claim 7, further comprising an alarm and wherein said electronic control unit is further configured to activate said alarm if said electronic control unit determines said wheel valve has failed.

11. The tire pressure management system of claim 10 wherein said alarm comprises a lamp.

12. The tire pressure management system of claim 7 wherein said electronic control unit is further configured, in determining whether said wheel valve has failed, to update a counter when said fluid pressure signal meets said first predetermined condition.

13. The tire pressure management system of claim 7 wherein said first control valve comprises a solenoid valve.

14. The tire pressure management system of claim 7 wherein said second control valve comprises a solenoid valve.

15. The tire pressure management system of claim 7 wherein said wheel valve comprises a check valve.

16. The tire pressure management system of claim 7 wherein said electronic control unit is further configured to compare said failure pressure signal to said first predetermined condition a predetermined period of time after urging said wheel valve to said closed position.

17. The tire pressure management system of claim 7 wherein said electronic control unit is further configured to maintain said first control valve in said first position for said first control valve and said second control valve in said second position for said second control valve prior to moving said venting of said conduit to thereby urge said wheel valve to an open position and inflate said tire.

18. The tire pressure management system of claim 1 wherein said conduit is disposed between a fluid source on a vehicle and said tire.

19. The tire pressure management system of claim 18 wherein said system is mounted on said vehicle for travel with said vehicle.

* * * * *

UNITED STATES PATENT AND TRADEMARK OFFICE
CERTIFICATE OF CORRECTION

| | |
|---|---|
| PATENT NO. | : 7,538,661 B2 |
| APPLICATION NO. | : 11/893258 |
| DATED | : May 26, 2009 |
| INVENTOR(S) | : Stephen P. Claussen and Daryl J. Stacer |

It is certified that error appears in the above-identified patent and that said Letters Patent is hereby corrected as shown below:

Claim 7, Col. 9, line 47: please delete the word "fist" and insert the word --first--.

Signed and Sealed this

Eleventh Day of August, 2009

David J. Kappos
*Director of the United States Patent and Trademark Office*